June 18, 1940.    B. C. PLACE    2,204,551
AUTOMOBILE DOOR AND METHOD OF MAKING THE SAME
Filed June 8, 1937    2 Sheets-Sheet 1
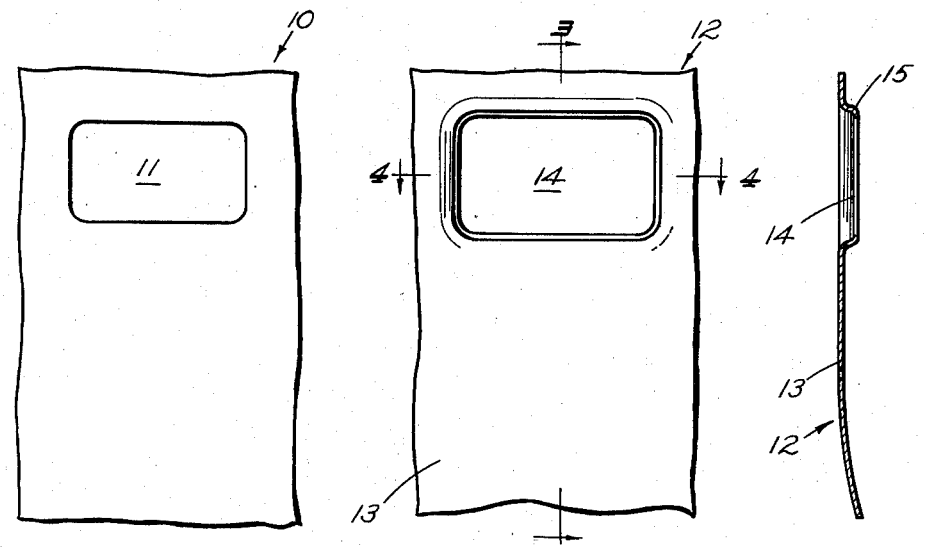
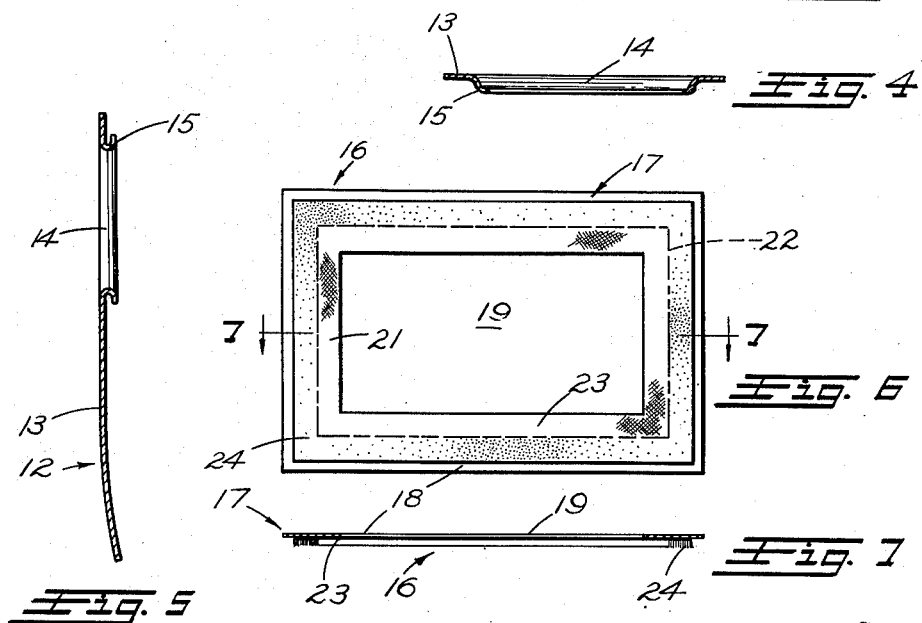
Inventor
Bion C. Place
By Strauch & Hoffman
Attorneys

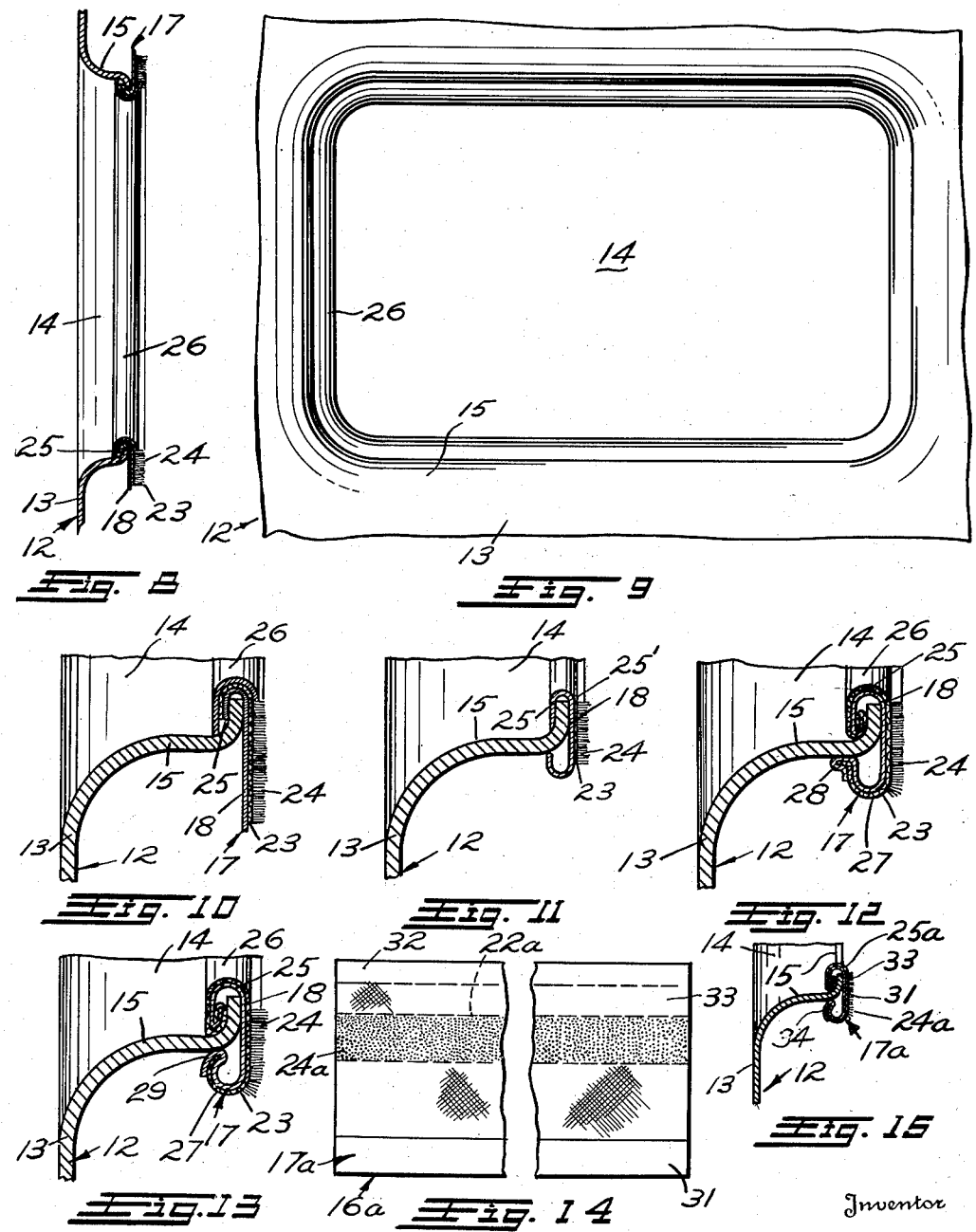

Patented June 18, 1940

2,204,551

UNITED STATES PATENT OFFICE 2,204,551

AUTOMOBILE DOOR AND METHOD OF MAKING THE SAME

Bion C. Place, Detroit, Mich., assignor of one-third to Harold W. Kost and one-third to Ellery J. Cloutier, both of Detroit, Mich.

Application June 8, 1937, Serial No. 147,133

4 Claims. (Cl. 296—44)

The present invention relates to a novel door, window or like construction, and, more particularly, to a novel automobile door, window or like construction designed to have weather-strip secured thereto and to a method of making the same.

It is now the general practice in constructing metal automobile bodies and doors to provide an inturned flange around the window opening, and to associate the weather or packing strip with said flange. The provision of said inturned flange involves costly manufacturing oper tions which are avoided by the present invention.

The primary object of this invention, accordingly, resides in the elimination of costly steps in the present method of manufacturing automobile window or like constructions, and the consequent elimination of the relatively expensive equipment and labor incident to the practice of said unnecessary steps.

A further and important object of this invention resides in a novel manner of securing a weather-strip to an automobile door, window or the like.

Another and more specific object of this invention consists in a method of simultaneously forming a panel, and providing it with a weather-strip receiving flange by a single die pressing operation.

A further object of the present invention resides in securing a weather-strip to a panel without using separate or independent fastening elements.

Another object of the present invention resides in providing a panel having a window opening with a weather-strip mounting flange extending away from the panel and into the window opening.

A further object of the present invention resides in the provision of a novel weather-strip structure that may be applied as a unit around the window opening of an automobile.

Still further objects will appear from the description when read in connection with the appended claims and attached drawings wherein:

Figure 1 is an elevational view of a portion of a metal blank from which the part of the door including the window opening may be shaped;

Figure 2 is a view similar to that of Figure 1 showing the shaped door part formed by a single die pressing operation on the blank;

Figure 3 is a vertical sectional view taken on line 3—3 of Figure 2;

Figure 4 is a horizontal sectional view taken on line 4—4 of Figure 2;

Figure 5 is a view similar to Figure 3 illustrating the construction of the window opening in doors as now manufactured;

Figures 6 and 7 are respectively enlarged elevational and sectional views illustrating a preferred form of weather-strip made in accordance with the present invention.

Figure 8 is an enlarged vertical, sectional view illustrating the manner in which the weather-strip of Figures 6 and 7 is secured to the door panel of Figure 3;

Figure 9 is an enlarged fragmentary front elevational view of the door with the weather-strip mounted and secured in place as in Figure 8.

Figure 10 is an enlarged fragmental sectional view of the lower corner of Figure 8.

Figure 11 is a fragmental sectional view of a modified form of the weather-strip of Figures 6 and 7 wherein the weather-strip is designed for use without a molding strip.

Figures 12 and 13 are fragmental sectional views illustrating different modes of bending the weather-strip molding to secure the same in place on the door of Figure 3; and Figures 14 and 15 are elevational and sectional views respectively of a modified form of weather-strip made in accordance with the present invention.

With continued reference to the drawings wherein the present invention is illustrated in connection with an automobile door construction, like reference numerals indicate the same parts throughout the several views of the drawings. The numeral 10 indicates a fragment of a sheet metal blank from which a door may be formed in accordance with the present invention. The blank 10 is provided with an opening 11 which ultimately serves as the window opening.

Blank 10 is shaped in suitable dies by a single pressing operation in well known manner to provide a door 12 having a body portion 13 of suitable contour and a window opening 14 bounded by a continuous inwardly extending flange 15 (Figures 2 and 3). At present the door of Figures 2 and 3 is subjected to further shaping operations by use of relatively expensive camming dies in order to bend flange 15 over into the position shown in Figure 5 to form an outwardly extending flange constituting a mounting for the weather-strip usually provided around opening 14. Since these operations require expensive dies and entail expensive labor operations, it is readily apparent that elimination of this step, accomplished by the present invention, results in great savings to the manufacturer.

Furthermore, the present commercial manner of securing a weather-strip comprises the use of separate fasteners adapted to be engaged in suitable openings in the flange that carries it. Since the working space provided between the flange and panel body is very small and not readily accessible, the mounting operation is difficult and tedious and results in further expensive labor operations. These difficulties are overcome by the present invention.

To this end, door 12, as shown in Figure 3, is utilized without resorting to further shaping operations. A novel weather-strip 16, provided by the present invention, permits the use of door 12 in said manner.

The weather-strip or packing strip structure 16 comprises a carrier or supporting structure 17 (Figures 6 and 7) including a metal flat plate-like member 18. Member 18 is preferably in the form of a rectangular open frame having an opening 19 therein. Opening 19 corresponds in shape but is smaller than opening 14 of door 12. Portion 21 of member 18 is bent inwardly from opening 19 to a point indicated by broken line 22 when applied to the door as hereinafter pointed out.

A suitable fabric or similar weather-excluding and packing element 23 is secured to one face of member 18 in any suitable manner, as for example by cement. Fabric 23 is provided with a relatively soft cushioning area 24 preferably extending partway across the width of said fabric. Cushioning area 24 may be formed of any suitable pile material such as hair or like fibrous material suitably secured to element 23.

Weather-strip structure 16 is secured to flange 15 of door 12 by spinning portion 21 of member 18 around the edge of flange 15 in a manner clear to those skilled in the art. This spinning operation provides hook-like members 25 extending longitudinally along the inner edge of member 18 and over-lapping the free edge of flange 15. Before the spinning operation the member 18 is placed against the flange 15 with the uncovered side thereof against the flange, and the thin sheet metal of which the frame-like member 18 is constructed is then firmly united to the door by bending or spinning the portion 21 around the flange as illustrated in Figures 8 and 10.

Weather-strip structure 16 may be used in this condition as illustrated in Figure 11. In this figure element 23 terminates at 25 leaving the members 25 exposed so that they may be painted or plated in any desired manner to provide a trim for opening 14.

However, if desired, an inverted U-shaped molding 26 may be provided to cover hook-like members 25. Molding 26 is crimped in place over members 25 and may be painted or plated in a color matching or contrasting to that of door 12 to provide a decorative trim and enhance the finished appearance of window opening 14.

The weather-strip structure 16 may be secured upon flange 15 as illustrated in Figures 12 and 13 in which the outer edge of carrier 17 is rolled over as shown at 27 in said figures so that foot-like portion 28 of Figure 12, or rolled portion 29 of Figure 13 engages a portion of flange 15. Said portions hold members 25 into snug engagement with flange 15 and prevent tilting movement of weather-strip structure 16 with respect to flange 15 and stiffens it at its margins. This operation, of course, is preferably performed prior to applying the structure to the flange. Molding 26 may be applied to the weather-strip structure or it may be omitted as in the form of the invention illustrated in Figure 11.

If desired, molding 26 may be painted in a color contrasting to that of panel 12 to form a trim around opening 14. As a consequence, when panel 12 is viewed as in Figure 9, the window opening provides an attractive finished appearance.

While the present invention contemplates making the weather-strip carrier 17 as a continuous member, as previously described, it is to be understood that each side of opening 14 may be provided with an individual weather-strip structure 16a as shown in Figures 14 and 15. Weather-strip structure 16a comprises a carrier member 17a formed by an elongated flat strip 31 having a portion 32 thereon extending outwardly from broken lines 22a. Strip 31 has a fabric strip 33 and a cushioning layer 24a secured on one of its faces. In this form of the invention, portion 32 of strip 31 is rolled over to provide hook-like portion 25a which is connected to flange 15 along one side of opening 14. The opposite edge of strip 31 is rolled under as previously pointed out in connection with the weather-strip structure 16 to provide a stiffening and holding bead 34. Molding 26 may be secured in place over the strip structure as previously pointed out to complete the assembly or said molding may be omitted as illustrated in Figure 11.

While the present invention has been described in connection with an automobile door, it is to be clearly understood that any panel having an opening therein designed to be closed by a glass panel or the like and provided with a suitable weather-strip may be constructed in a like manner. For example, the present invention may be used in connection with the window opening in the rear panel, the rear side panel, the quarter window panel, the windshield panel or any similar panel having a glazed opening.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A weather-stripping element for use in weather-stripping the window opening of an automobile door or body, comprising a supporting member in the form of a continuous rigid rectangular sheet metal frame having an opening in the center thereof, a combined weather excluding and cushioning element secured to one side of said supporting member, and means comprising a continuous area of said supporting member adjacent an edge thereof adapted to be spun over into hooking engagement with the edges of said window opening for interlocking said weather-strip to said door or body.

2. A vehicle or like door or body construction comprising a metal door having a window opening, a continuous flange of said door offset inwardly from the plane of said door and extending into said opening to form a weather-strip mounting, and a continuous, rigid, weather-strip structure, corresponding in shape to the window opening and having an open center, mounted on said flange, said weather-stripping structure including a continuous interlocking portion spun around the edge of said flange.

3. The combination defined in claim 2 wherein a molding overlies said interlocking portion to impart a finished appearance to said window opening and protect the weather-strip from injury by the elements.

4. A vehicle or like door or body construction comprising a metal door having a window opening, a continuous flange on said door offset inwardly from the plane of said door and extending into said opening to form a weather-strip mounting, a weather-strip comprising a sheet-metal member having a suitable weather-stripping material secured on one face and extending from one edge to a point just short of the other edge, means for securing said weather-strip to said flange, said means comprising said one edge bent around said flange with the weather-strip material on said edge exposed around the window opening, and a finishing molding disposed over said means and crimped thereon to provide a finished appearance and protecting said weather-strip.

BION C. PLACE.